(12) United States Patent
Burnett

(10) Patent No.: US 6,985,560 B1
(45) Date of Patent: Jan. 10, 2006

(54) APPARATUS AND METHOD FOR ENABLING AUTOMATIC MEASUREMENT OF PERFORMANCE IN A TELEPHONY COMMUNICATION SYSTEM

(75) Inventor: Charles J Burnett, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/558,185

(22) Filed: Apr. 26, 2000

(51) Int. Cl.
*H04M 1/24* (2006.01)
(52) U.S. Cl. .................................. 379/22.01; 379/27.01
(58) Field of Classification Search .............. 379/1.01, 379/27.01, 29.01, 3, 229, 22.01, 27; 370/360, 370/282, 389, 466, 467
See application file for complete search history.

(56) References Cited

U.S. PATENT DOCUMENTS

| | | | | |
|---|---|---|---|---|
| 5,034,978 A | * | 7/1991 | Nguyen et al. | 379/402 |
| 5,784,406 A | * | 7/1998 | DeJaco et al. | 375/224 |
| 5,883,891 A | | 3/1999 | Williams et al. | 370/356 |
| 5,887,027 A | * | 3/1999 | Cohen et al. | 375/222 |
| 6,014,425 A | * | 1/2000 | Bingel et al. | 379/26.02 |
| 6,154,523 A | * | 11/2000 | Hofmann et al. | 379/22 |
| 6,396,911 B1 | * | 5/2002 | Kostan et al. | 379/93.14 |
| 6,442,248 B1 | * | 8/2002 | Davis | 379/93.02 |
| 6,775,240 B1 | * | 8/2004 | Zhang et al. | 370/251 |

OTHER PUBLICATIONS

Harry Newton, "Newton's Telecom Dictionary", 1998, p. 264.*
"TMC Internet Telephony, The Authority on Voice, Video, Fax, and DAta Convergence," Computer Telephony Testing, IP Telephony, Call Center, and Load Testing from Hammer, vol. 1, No. 6, Dec. 1998, pp. 1-3.

* cited by examiner

*Primary Examiner*—Curtis Kuntz
*Assistant Examiner*—Barry W Taylor

(57) ABSTRACT

An apparatus and method are provided for obtaining, from an analog subscriber loop, test data that may be used to test the performance of a telephony communication system. The apparatus includes a digital-to-analog (D/A) converter, a first port, a second port, and an analog-to-digital (A/D) converter. The D/A converter receives digital data and converts the digital data into a first analog signal. The first port transmits the first analog signal across a first subscriber loop to a telephony communication network. The network, via A/D and D/A conversion, translates the first analog signal to a second analog signal and transmits the second analog signal to the second port via a second subscriber loop. The A/D converter receives the second analog signal from the second port and converts the second analog signal into the digital test data, which is then used to analyze the performance of the telephony communication system.

29 Claims, 6 Drawing Sheets

APPARATUS AND METHOD FOR ENABLING AUTOMATIC MEASUREMENT OF PERFORMANCE IN A TELEPHONY COMMUNICATION SYSTEM

BACKGROUND OF THE INVENTION

1. Field of the Invention

The present invention generally relates to telephony performance measurement techniques and, in particular, to an apparatus and method for interfacing with an analog subscriber loop of a telephony communication system and for obtaining, from the subscriber loop, test data that may be used to test the performance of the telephony communication system.

2. Related Art

Initially, telephony networks provided an end-to-end analog communication connection for voice communication. During a telephone call, a user would speak into a telephone, which was coupled to an analog connection, referred to as a "subscriber loop." The telephone would convert the user's voice into analog signals and transmit the analog signals across the subscriber loop to an analog network, such as the well known publicly switched telephone network (PSTN). The PSTN would then route the analog signals through various analog connections to another subscriber loop coupled to another telephone that receives the analog signals. The receiving telephone then converted the analog signals into sound so that a user at the receiving telephone could hear the conversation of the user at the transmitting telephone.

Each communication connection segment used to transmit the signals from the transmitting telephone to the receiving telephone was analog such that a single end-to-end analog communication connection was effectively provided that communicated the analog signals of the telephone call between the two telephones. Although there was a delay in transmitting from one telephone to the other telephone, each analog signal experienced approximately the same delay. Therefore, as long as the delay was small (e.g., on the order of about one second or less), users did not usually notice the delay.

Although most end-to-end analog communications were fairly reliable, problems sometimes developed that would cause excessive noise, cross-talk, or other similar performance degrading effects. To test the quality of the signals communicated by the analog network, an operator would usually place a call and listen to the sound produced by the analog signals transmitted through the network. If the operator detected significant performance degradation, such as significant noise, cross-talk, etc., the communication segments and devices used to transmit the signals would be further tested in an attempt to isolate and correct the problems causing the performance degradation.

Recently, many telephony networks have been redesigned to communicate digitally to improve the performance of the networks. However, due primarily to the expense of installing digital subscriber loops, many of the subscriber loops used to transmit voice signals have remained analog. Therefore, during a telephone call, a user typically speaks into a telephone that converts the user's voice into analog signals. These analog signals are then transmitted across an analog subscriber loop to a digital telephony network. At some point in the digital network, the analog signals are converted into digital signals and transmitted across digital connections. Prior to being communicated across the subscriber loop coupled to the receiving telephone, the digital signals are converted back into analog signals so that the signals are compatible with the subscriber loop. Therefore, the operation of the foregoing digital telephony network is similar to prior analog telephony networks, except that the signals communicated by the foregoing digital telephony network are converted into digital signals for transmission across at least a portion of the network.

Unfortunately, the conversion of the analog signals into digital signals can cause certain problems. For example, the digital portion of some networks utilizes packet switching techniques, in which the digital signals are transmitted as separate packets through the digital portion of the network. Although the packets are transmitted from the same beginning point and the same ending point within the digital portion of the network, the path for each packet may be different. Therefore, the delay experienced by each packet may be significantly different than the delay experienced by other packets. When the packets are received at the ending point, the packets are reassembled into the correct order before being converted back into analog signals so that the analog signals accurately represent the conversation being communicated. The aforementioned packet switching techniques introduce a delay, which is sometimes noticeable by the users associated with the telephone call.

Due to the various problems that can be caused by utilizing a digital network in communicating voice signals, such as the delay introduced by packet switching, it is desirable to test the transmission quality of digital telephony networks more frequently as compared to traditional analog telephony networks. Therefore, various devices that enable automatic testing of voice signals in a digital telephony network have been developed. However, most of these devices are designed to interface with the digital portion of the telephony network and are designed to test the digital signals being communicated by the digital portion of the telephony network. The inventor of the present invention believes that a superior voice quality testing device can be implemented, if the testing device is interfaced at an analog end of the network and is configured to test the analog signals communicated at this analog end during a telephone call.

Thus, a heretofore unaddressed need exists in the industry for providing an improved apparatus and method for enabling automatic testing of voice signals at an analog end of a digital telephony network.

SUMMARY OF THE INVENTION

The present invention overcomes the inadequacies and deficiencies of the prior art as discussed hereinbefore. Generally, the present invention provides an apparatus and method for obtaining digital test data from an analog subscriber loop that may be used to test a telephony communication system.

In architecture, the present invention includes a digital-to-analog (D/A) converter, a first port, a second port, and an analog-to-digital (A/D) converter. The D/A converter receives digital data and converts the digital data into a first analog signal. The first port transmits the first analog signal across a first subscriber loop to a telephony communication network. The network, via A/D and D/A conversion, translates the first analog signal to a second analog signal and transmits the second analog signal to the second port via a second subscriber loop. The A/D converter receives the second analog signal from the second port and converts the second analog signal into digital test data, which is then used to analyze the performance of the telephony communication system.

In accordance with another feature of the present invention, a first digital signal processor is utilized to transmit the first analog signal via the first port, and a second digital processor is utilized to receive the second analog signal via the second port. As a result, signals may be simultaneously communicated via the first and second ports.

In accordance with another feature of the present invention, session control logic may be used to automatically control a hook status of the foregoing system and to establish a communication session via the first and second ports.

In accordance with another feature of the present invention, the system of the present invention may be implemented on a PCI card and interfaced with a personal computer that is configured to render data indicative of performance of the telephony communication system based on the information obtained by the system of the present invention.

In accordance with another feature of the present invention, additional ports may be included to enable communication via different types of signaling.

The present invention can also be viewed as providing a method for obtaining digital test data and for testing a telephony communication system based on said digital test data. The method can be broadly conceptualized by the following steps: transmitting a first analog signal from a subscriber loop interface to a telephony communication network via a first subscriber loop coupled to the subscriber loop interface; receiving a second analog signal at the subscriber loop interface, the second analog signal translated from the first analog signal by said telephony communication network and transmitted to the subscriber loop interface via a second subscriber loop coupled to the subscriber loop interface; analyzing information defined by the second analog signal; and determining, based on the analyzing step, a parameter indicative of performance of the telephony communication system.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The present invention generally provides an apparatus and method for obtaining test data to test the performance of analog and digital telephony communication systems. To illustrate the principles of the present invention, refer to FIG. 1, which depicts a conventional telephony communication system 15 that utilizes a digital network 17.

Figure 1:
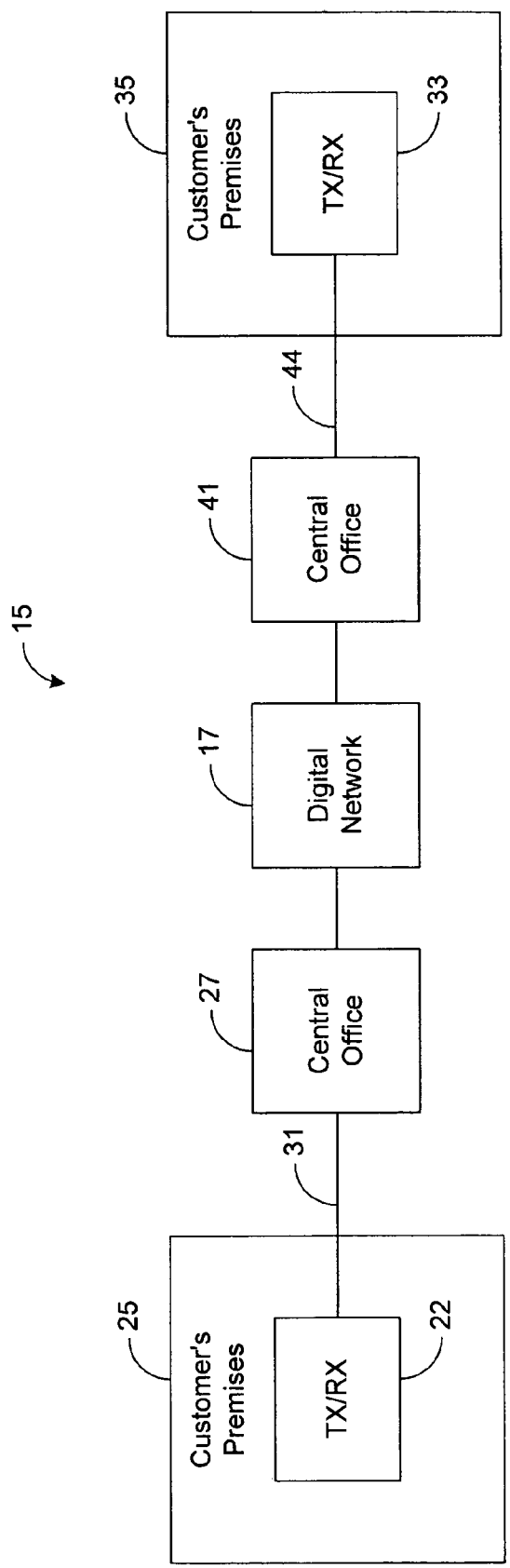
FIG. 1 is a block diagram illustrating a conventional telephony communication system.

As shown by FIG. 1, a communication device 22, such as a telephone, for example, residing at a customer's premises 25 is coupled to a central office 27 of the telephony communication system 15 via a subscriber loop 31, which is often a pair of copper wires configured to transmit analog signals. During a telephone call, voice signals are communicated between the telephone 22 at customer's premises 25 and another communication device 33, such as another telephone, at another customer's premises 35. Telephone 33 is usually coupled to another central office 41 via another subscriber loop 44.

A user at premises 25 speaks into telephone 22, which converts the user's voice into analog signals and transmits these analog signals to central office 27 via subscriber loop 31. Devices at the central office 27 receive the analog signals and convert the analog signals into digital signals. These digital signals are then transmitted via digital network 17 to central office 41. Although various types of digital networks may be used to communicate the digital signals, the digital network 17 shown by FIG. 1 is often configured as a packet switching network, such as or similar to a network employing internet protocol (IP).

Therefore, devices at the central office 27 are designed to group the digital data produced from the analog signals received from subscriber loop 31 into separate packets of data. Each of the packets includes a header that identifies a device at central office 41 as the destination. Each packet is then transmitted via digital network 17 to the destination device at central office 41. Although each packet should ultimately be received by the destination device at the central office 41, the data packets may be transmitted via different paths and routers through the digital network 17. As a result, it typically takes different time periods to transmit the different packets through the network 17, and the packets are usually not received in the order that they were transmitted.

Devices at the central office 41 usually arrange the packets into the correct order (i.e., the order that the packets were transmitted from central office 27) and then convert the digital data in the packets back into analog signals. The steps of transmitting signals digitally across digital network 17 and arranging the packets in the correct order generally increases the delay associated with transmitting signals from telephone 22 to telephone 33.

Once the digital data received by the central office 41 has been converted back into analog signals, the central office 41 transmits the analog signals to telephone 33 via subscriber loop 44. The telephone 33 then converts these analog signals into sound, which resembles the voice of the user at premises 25 when the user at premises 25 previously spoke into the telephone 22.

The user at premises 35 may speak into telephone 33, and the user's voice may be converted into analog signals by the telephone 33. These analog signals may then be transmitted to telephone 22 via the telephony communication network 15 similar to how the analog signals produced at telephone 22 are transmitted to telephone 33. Furthermore, the signals communicated between telephones 25 and 33 may be simultaneously transmitted by the system 15 in both directions such that the users can both hear and speak at the same time.

When a user speaks into a telephone 22 or 33, it is common for the user to hear an echo. It is well known that a portion of each analog signal transmitted across a subscriber loop 31 or 44 is reflected back to the telephone 22 or 33 that originally transmitted the analog signal such that the user hears an echo of the original signal. The delay and volume of the echo varies depending on various characteristics (e.g., impedance, length, etc.) of the communication connections (e.g., subscriber loops 31 and 44) used to transmit the signal.

Figure 2:
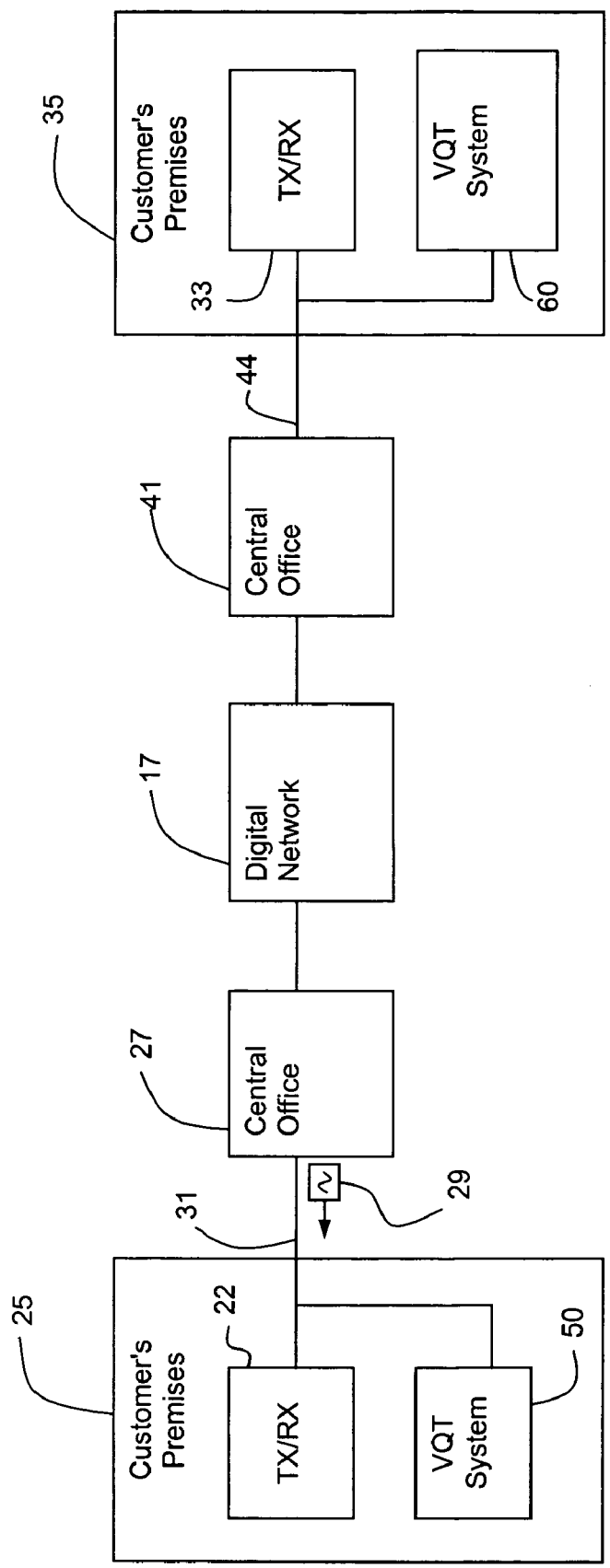
FIG. 2 is a block diagram illustrating voice quality testing systems in accordance with the present invention that are coupled to the conventional telephony communication system depicted in FIG. 1.

The present invention, in general, provides a system and method for enabling automatic testing of performance of the telephony communication network 15. As shown by FIG. 2, the present invention includes a voice quality testing (VQT) system 50 that interfaces with the analog subscriber loop 31. In this regard, the testing system 50 preferably includes a standard RJ-11 or RJ-45 connector that enables the testing system 50 to be plugged directly into a standard RJ-11 or RJ-45 jack at the premises 25 of a user. However, it is possible to employ other techniques, such as wire splicing, for example, or other connectors to couple the testing system 50 to subscriber loop 31, if desired. In addition, it is not necessary for the testing system 50 to be employed at the user's premises 25, and it is possible for the testing system 50 to be interfaced with the system 15 at any point along the analog subscriber loop 31.

The testing system 50 may be designed to establish a communication session with a transceiver at premises 35 (e.g., with the telephone 33 or another voice quality testing system 60). Then, the testing system 50 is designed to transmit analog voice signals over subscriber loop 31 and to simultaneously detect the signals that are being transmitted over subscriber loop 31. The testing system 0 then analyzes the detected signals to determine performance characteristics of the telephony communication system 15. For example, the testing system 50 may transmit a recording of a person's speech as analog voice signals over the subscriber loop 31. While the testing system 50 is transmitting the recording, the testing system 50 can simultaneously detect the echo 29 of the recording. Data defining the echo 29 can then be analyzed through conventional techniques to determine various characteristics, such as echo delay, echo signal strength, etc.

The analog voice signals transmitted by the testing system 50 pass through the telephony system 15 and are eventually transmitted over subscriber loop 44. The analog signals are preferably converted into digital signals for transmission through a portion (i.e., digital network 17) of the telephony system 15.

The testing system 60 at premises 35 is configured to receive the analog voice signals and to test the analog voice signals through techniques known in the art. For example, the recorded speech that is being transmitted by the testing system 50 may be known to the testing system 60. Therefore, the testing system 60 is aware of the original duration of the speech being transmitted by the testing system 50, and it is possible to detect the delay introduced by the digital network 17. In this regard, the delay of the digital network 17 is approximately the duration of the speech received by the testing system 60 minus the duration of the speech originally transmitted by testing system 50. Note that the testing system 60 may be configured identical to the testing system 50, which will be described in more detail hereinbelow.

Figure 3:
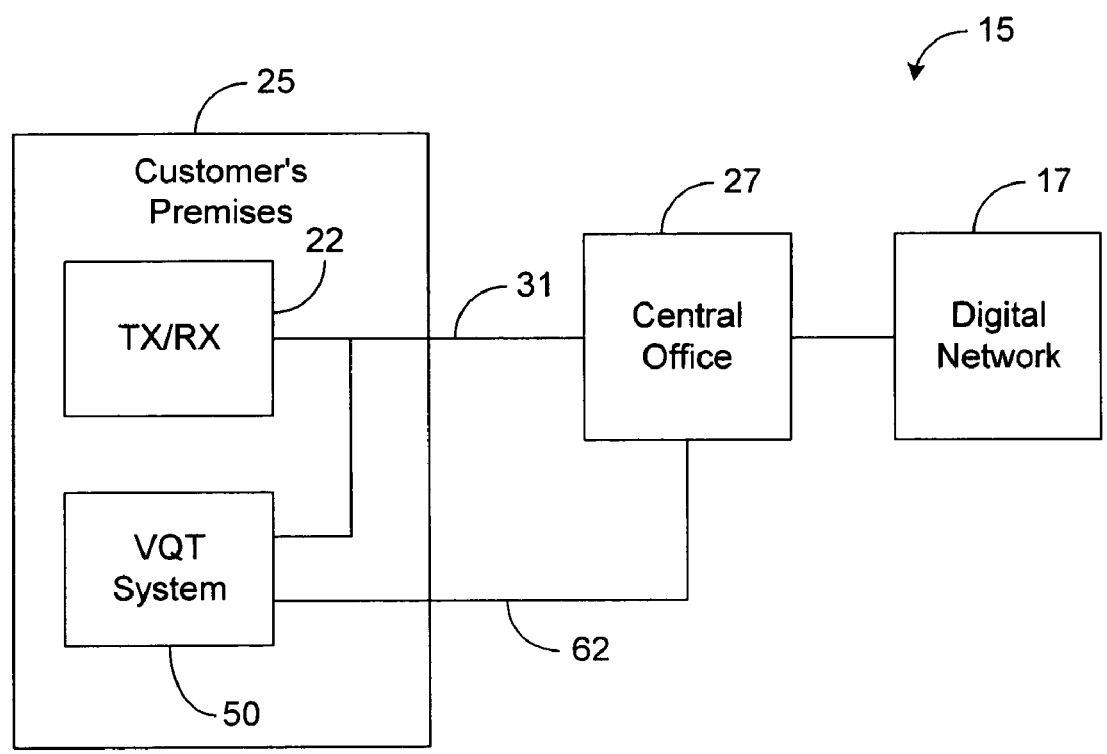
FIG. 3 is a block diagram illustrating a single one of the voice quality testing systems of FIG. 2 coupled to another embodiment of the telephony communication system of FIG. 1.

FIG. 3 depicts another embodiment of the present invention. In the embodiment depicted by FIG. 3, the testing system 50 is coupled to another subscriber loop 62. Instead of establishing a communication session with devices at a remote premises 35, a communication session between multiple ports of the testing system 50 is established. Therefore, the analog voice signals transmitted to central office 27 via subscriber loop 31 are converted to digital data and pass through the digital network 17, as described above, except that the digital data is routed to central office 27 instead of central office 41. The central office 27 converts this digital data into analog signals and interfaces the analog signals with subscriber loop 62. The testing system 50 receives the analog signals from subscriber loop 62 and then tests these signals via the same techniques used by testing system 60 to test the analog signals received via subscriber loop 44 in the previous embodiment.

Figure 4:
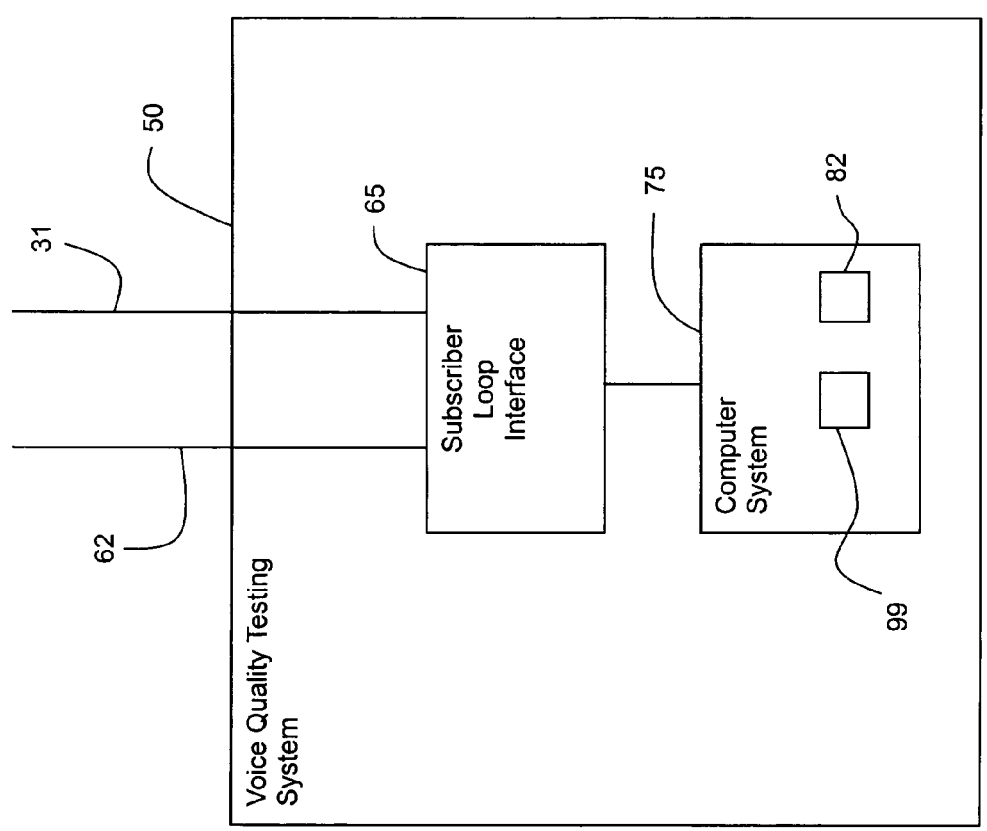
FIG. 4 is a block diagram illustrating a more detailed view of a voice quality testing system depicted in FIGS. 2 and 3.

FIG. 4 depicts a more detailed view of the testing system 50. As shown by FIG. 4, the testing system 50 includes a subscriber loop interface 65 and a computer system 75. The computer system 75 preferably stores digital data defining speech that is to be transmitted over subscriber loop 31 by testing system 50. When the digital speech data is to be transmitted over the subscriber loop 31, the computer system 75 transmits the digital speech data to subscriber loop interface 65, which converts the digital speech data into analog signals and interfaces these analog signals with the analog subscriber loop 31.

While transmitting the analog signals over subscriber loop 31, the subscriber loop interface 65 can be configured to simultaneously detect the signals being transmitted across the subscriber loop 31. The subscriber loop interface 65 can then be designed to convert the detected signals into digital data and to transmit this digital data to computer system 75. The computer system 75 is designed to analyze this digital data to determine various characteristics of the communication of the telephony communication system 15, such as, but not limited to, characteristics of the echo received from subscriber loop 31 and/or the delay introduced by the digital network 17.

Figure 5:
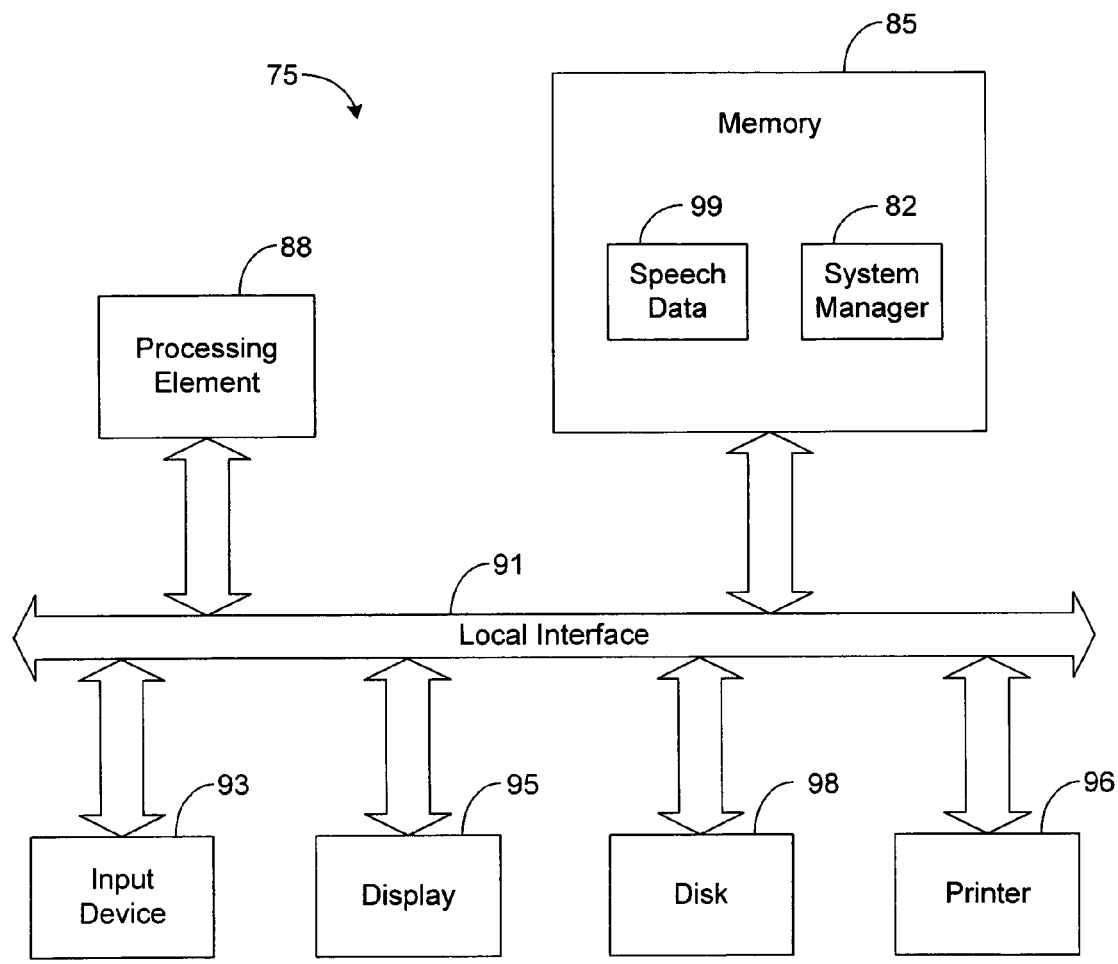
FIG. 5 is a block diagram illustrating a more detailed view of a computer system depicted in FIG. 4.

FIG. 5 depicts a more detailed view of the computer system 75. As shown by FIG. 5, the computer system 75 includes a system manager 82 that controls the operation of the computer system 75. The system manager 82 can be implemented in software, hardware, or a combination thereof. In the preferred embodiment, as illustrated by way of example in FIG. 5, the system manager 82 along with its associated methodology is implemented in software and stored in computer memory 85 of the computer system 75.

Note that the system manager 82, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system manager 82 may be magnetically stored and transported on a conventional portable computer diskette.

The preferred embodiment of the computer system 75 of FIG. 5 comprises one or more conventional processing elements 88, such as a digital signal processor (DSP), that communicate to and drive the other elements within the system 75 via a local interface 91, which can include one or more buses. Furthermore, an input device 93, for example, a keyboard or a mouse, can be used to input data from a user of the system 75, and screen display 95 or a printer 96 can be used to output data to the user. A disk storage mechanism 98 can be connected to the local interface 91 to transfer data to and from a nonvolatile disk (e.g., magnetic, optical, etc.).

As shown by FIG. 5, digital speech data 99, which defines the speech that is to be transmitted over subscriber loop 31, is stored in memory 85 along with system manager 82. As previously described, during a test of the system 15, the speech data 99 is transmitted to subscriber loop interface 65, which interfaces the speech data 99 with subscriber loop 31.

Figure 6:
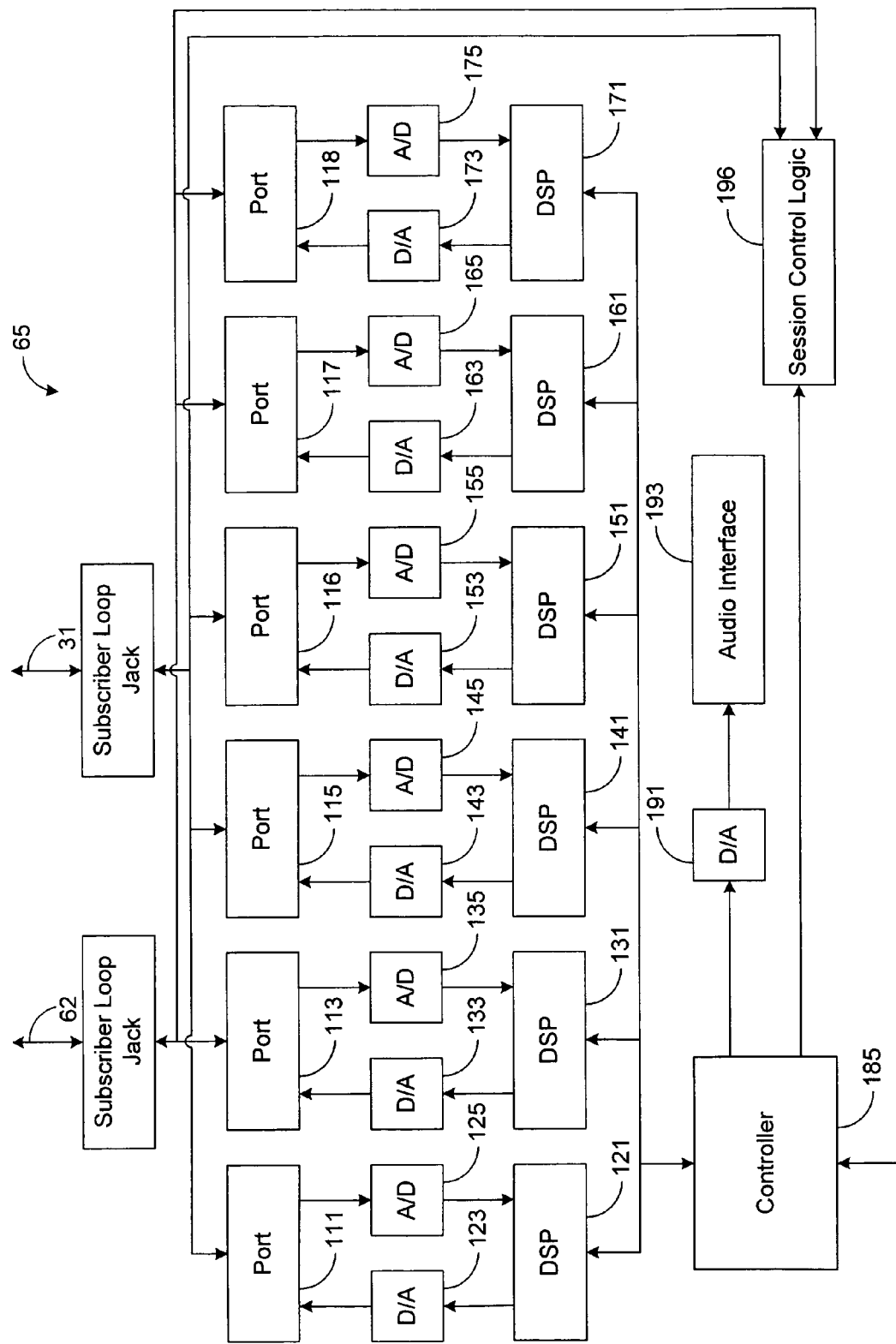
FIG. 6 is a block diagram illustrating a more detailed view of a subscriber loop interface depicted in FIG. 5.

FIG. 6 depicts a more detailed view of the subscriber loop interface 65. The subscriber loop interface 65 depicted by FIG. 5 includes six ports 111, 113, 115, 116, 117, and 118, although a different number of ports may be utilized in other embodiments. Ports 111 and 113 are configured to interface signals between the testing system 50 and the subscriber loops 31 and/or 62 when FXO signaling is being used for communication. Ports 115–118 are configured to interface signals between the testing system 50 and the subscriber loops 31 and/or 62 when E&M signaling is being used for communication.

Port 111 is coupled to a digital signal processor (DSP) 121 via a digital-to-analog (D/A) converter 123 and an analog-to-digital (A/D) converter 125. When port 111 is used for transmitting from the testing system 50, digital speech data 99 is downloaded from the computer system 75 to the DSP 121. The DSP 121 then transmits the speech data 99 to D/A converter 123 and provides the necessary control signals to D/A converter 123, A/D converter 125, and/or port 111 to enable the speech data 99 to be transmitted across subscriber loop 31. In response, the D/A converter 123 converts the speech data 99 into analog signals and transmits the analog signals to port 111. The port 111 then interfaces these analog signals with the subscriber loop 31 such that the analog signals are appropriately transmitted across the subscriber loop 31.

When the port 111 is used for receiving data from the subscriber loop 31, the DSP 121 provides control signals to port 111, D/A converter 123, and/or A/D converter 125 such that the analog signals received from subscriber loop 31 are transmitted to A/D converter 125 and converted into digital data by the A/D converter 125. This digital data is then transmitted to DSP 121, which stores the digital data. When desired, this digital data is uploaded to the computer system 75, which then analyzes the digital data to determine the quality of the analog signals transmitted across the subscriber loop 31 and, in other words, to evaluate the performance of the telephony system 15.

To test the echo and other parameters associated with subscriber loop 31, signals are simultaneously transmitted and received by port 111. In this regard, the DSP 121 controls D/A converter 123 and A/D converter 125 such that both converters 123 and 125 are simultaneously active. The DSP 121 then transmits the digital data downloaded from computer system 75 to D/A converter 123 and stores the digital data received from A/D converter 125. The data from A/D converter 125 being stored by the DSP 121 should define the echo of the speech defined by the digital data being transmitted to D/A converter 123. Either during or after the interfacing of data between the port 111 and the subscriber loop 31, the data from A/D converter 125 can be uploaded to computer system 75 for testing. Alternatively, the DSP 121 can be configured to test the echo data and to provide the results of the test to computer system 75, which interfaces the results to a user of the computer system 75.

Preferably, port 113, DSP 131, D/A converter 133, and A/D converter 135 are configured identical to and operate the same as port 111, DSP 121, D/A converter 123, and A/D converter 125, respectively, except that port 113 is adapted for coupling to the other subscriber loop 62. Therefore, port 111 may be used to transmit FXO signals from testing system 50 to subscriber loop 31 and/or to receive FXO signals from subscriber loop 31, while port 113 is used to simultaneously transmit FXO signals from testing system 50 to subscriber loop 62 and/or to receive FXO signals from subscriber loop 62.

Having another FXO port 113 enables a communication session to be established between port 111 and 113 when the system 15 is configured according to FIG. 3. When a communication session is established between ports 111 and 113, any signals transmitted across subscriber loop 31 or 62 by one of the ports 111 or 113 passes through the digital network 17 and is received by the other port 111 or 113. In other words, an end-to-end connection through the network 17 is established in which one of the ports 111 or 113 is coupled to or terminates one of the ends of the end-to-end connection and in which the other of the ports 111 or 113 is coupled to or terminates the other of the ends of the end-to-end connection.

As a result, the testing system 50 can control both ends of the end-to-end connection and, therefore, have more control over the test environment. In this regard, a number of events could occur to disrupt or degrade the test of the telephony system 15 in the configuration of FIG. 1. For example, establishment of a communication session between premises 25 and 35 could be thwarted due to a busy signal. Also, a user at premises 35 could create an off-hook condition on the subscriber loop 44 with another communication device at premises 35 and attempt to place a call, thereby interrupting a previously established communication session. Furthermore, it is possible for the user at premises 35 to fail to couple the testing system 60 to the subscriber loop 44, thereby preventing certain tests from being performed. There are numerous other events that could occur to prevent the testing or to degrade the quality of the testing performed by the testing system 50, when one end of the end-to-end connection is located at a remote premises 35. However, a user at premises 25 can prevent many of these events from occurring, when the configuration of FIG. 3 is used to perform a test of the system 15. Furthermore, the configuration of FIG. 3 eliminates the need of a separate compatible testing system 60.

As set forth hereinabove, ports 115–118 are configured to interface E&M signals between testing system 50 and subscriber loops 31 and/or 62. As shown by FIG. 6, port 115 is coupled to a digital signal processor (DSP) 141 via a digital-to-analog (D/A) converter 143 and an analog-to-digital (A/D) converter 145. When port 115 is used for transmitting from the testing system 50, speech data 99 is downloaded from the computer system 75 to the DSP 141. The DSP 141 then transmits the speech data 99 to D/A converter 143 and provides the necessary control signals to D/A converter 143, A/D converter 145, and/or port 115 to enable the speech data 99 to be transmitted across subscriber loop 31. In response, the D/A converter 143 converts the speech data 99 into analog signals and transmits the analog signals to port 115. The port 115 then interfaces these analog signals with the subscriber loop 31 such that the analog signals are appropriately transmitted across the subscriber loop 31.

When the port 115 is used for receiving data from the subscriber loop 31, the DSP 141 provides control signals to port 115, D/A converter 143, and/or A/D converter 145 such that the analog signals received from subscriber loop 31 are transmitted to A/D converter 145 and converted into digital data by the A/D converter 145. This digital data is then transmitted to DSP 141, which stores the digital data. When desired, this data is uploaded to the computer system 75, which then analyzes the digital data to determine the quality of the analog signals transmitted across the subscriber loop 31 and, in other words, to evaluate the performance of the telephony system 15.

To test the echo and other parameters associated with subscriber loop 31, signals are simultaneously transmitted and received by port 115. In this regard, the DSP 141 controls D/A converter 143 and A/D converter 145 such that both converters 143 and 145 are simultaneously active. The DSP 141 then transmits the digital data downloaded from computer system 75 to D/A converter 143 and stores the digital data received from A/D converter 145. The data from A/D converter 145 being stored by the DSP 141 should define the echo of the speech defined by the digital data being transmitted to D/A converter 143. Either during or after the interfacing of data between port 115 and subscriber loop 31, the data from A/D converter 145 can be uploaded to computer system 75 for testing. Alternatively, the DSP 141 can be configured to test the echo data and to provide the results of the test to computer system 75, which interfaces the results to a user of the computer system 75.

It is well known that E&M signaling sometimes occurs over a two pair connection instead of a single pair connection. In such an embodiment, the signals are transmitted from premises 25 to central office 27 via one of the pairs, and signals are transmitted from central office 27 to premises 25 via the other of the pairs. To enable simultaneous interfacing of data between the testing system 50 and both pairs of a two pair subscriber loop 31, port 115 can be coupled to one of the pair of wires of the subscriber loop 31, while port 116 is coupled to the other pair of wires of the subscriber loop 31. In this regard, port 116, DSP 151, D/A converter 153, and A/D converter 155 are preferably configured identical to and operate the same as port 115, DSP 141, D/A converter 143, and A/D converter 145, respectively. Therefore, assuming that port 115 is coupled to one of the wire pairs of a two pair subscriber loop 31 and that port 116 is coupled to the other wire pair of the two pair subscriber loop 31, port 115 may be used to transmit and/or receive data via one of the pairs, while port 116 simultaneously transmits and/or receives data via the other pair of wires.

Port 117, D/A converter 163, A/D converter 165, and DSP 161 are configured identical to and operate the same as port 115, D/A converter 143, A/D converter 145, and DSP 141, except that port 117 is configured to couple to the subscriber loop 62 of FIG. 3. Furthermore, port 118, D/A converter 173, A/D converter 175, and DSP 171 are configured identical to and operate the same as port 116, D/A converter 153, A/D converter 155, and DSP 151, except that port 118 is configured to couple to subscriber loop 62 of FIG. 3. Therefore, E&M signals may be communicated over subscriber loop 62 via ports 117 and 118 in the same way that E&M signals are communicated over subscriber loop 31 via ports 115 and 116. Since ports 115 and 116 are coupled to one subscriber loop 31 and ports 117 and 118 are coupled to another subscriber loop 62, the testing system 50 can be coupled to both ends of an end-to-end connection. Therefore, the previously described benefits of controlling both ends of an end-to-end communication connection passing through network 17 can be realized for an E&M communication session.

As with ports 111 and 113, it is desirable to provide each port 115, 116, 117, and 118 with a separate DSP 141, 151, 161, and 171, respectively, in order to realize and/or maximize many of the advantages of the testing system 50. Therefore, it is preferable for each of the ports 115, 116, 117, and 118 to be coupled to and controlled by a dedicated DSP 141, 151, 161, and 171, as shown by FIG. 6. However, since ports 111 and 113 are not utilized during E&M signaling and since ports 115–118 are not utilized during FXO signaling, it is possible for the same DSP to be used for one of the ports 111 or 113 and for one of the ports 115, 116, 117, or 118. For example, when E&M signaling is being used for communication across subscriber loop 31, DSP 121 may be coupled to and used to control port 115 instead of port 111, thereby eliminating the need of a separate DSP 141.

A controller 185 is configured to control the operation of the subscriber loop interface 65. The controller 185 may be implemented in hardware, software, or a combination thereof. To this end, the controller 185 may include a DSP (not shown) and/or hardware logic (not shown) to implement the functionality of the controller 185, which will be described in more detail below.

The controller 185 is configured to provide control signals to DSPs 121, 131, 141, 151, 161, and 171 indicating whether each DSP 121, 131, 141, 151, 161, and 171 should be in a transmit mode, a receive mode, or a non-active mode. Each DSP 121, 131, 141, 151, 161, and 171 in a non-active mode is idle. Each DSP 121, 131, 141, 151, 161, and 171 in a transmit mode receives digital data and causes its respective port 111, 113, 115, 116, 117, or 118 to transmit the received data across subscriber loop 31 after the received data has been converted into analog signals. Each DSP 121, 131, 141, 151, 161, and 171 in a receive mode causes its respective port 111, 113, 115, 116, 117, or 118 to receive data from the subscriber loop 31 and to transmit the received data to the DSP 111, 113, 115, 116, 117, or 118 via an A/D converter 125, 135, 145, 155, 165, or 175, which converts the received data into digital data. During an upload of this digital data to computer system 75, the DSP 121, 131, 141, 151, 161, or 171 transmits this digital data to controller 185.

When the controller 185 receives digital data from one of the DSPs 121, 131, 141, 151, 161, or 171, the controller 185 is configured to transmit this data to the computer system 75 so that the computer system 75 can analyze the data. When the controller 185 receives the speech data 99 from the computer system 75, the controller 185 is configured to transmit the speech data 99 to at least one of the DSPs 121, 131, 141, 151, 161, or 171 in the transmit mode.

The controller 185 may also transmit any data received from one or more of the DSPs 121, 131, 141, 151, 161, and 171 to a D/A converter 191. The D/A converter 191 is configured to convert this data into analog signals and to transmit these analog signals to audio interface 193. The audio interface 193 either produces sound based on the analog signals or interfaces the signals with a device (not shown) that is configured to produce sound based on the analog signals. Therefore, a user may hear the sounds defined by the analog signals received from subscriber loop 31.

In addition, the controller 185 may be configured to transmit to the audio interface 193 the speech data 99 received from computer system 75, thereby enabling the user to hear the sounds defined by the speech data 99. The speech data 99 may be transmitted to the audio interface 193 alternatively to the data received from subscriber loop 31 or may be transmitted to the audio interface 193 in combination with the data received from subscriber loop 31.

When the speech data 99 and the data received from subscriber loop 31 are both transmitted to the audio interface 193, the user should be able to hear a simulation of the sounds defined by the data communicated across subscriber loop 31. Therefore, a user should hear a sound defined by the speech data 99 as well as the echo produced in response to the data defining the sound. Assuming no significant delays between transmitting the speech data 99 to the audio interface 193 and transmitting the speech data 99 across subscriber loop 31, the delay between the sound and the echo heard by the user via audio interface 193 should correspond to the delay of the echoes on subscriber loop 31. As a result, the user may analyze the sufficiency of the echo delay across subscriber loop 31 by listening to the sounds produced via audio interface 193.

In some embodiments, the telephone 22 may set up a telephone call to enable communication to occur over subscriber loop 31. In this regard, the telephone 22 (after going off-hook) may dial the number identifying subscriber loop 44 or 62, and through techniques known in the art, a communication session between the telephone 22 and another device, such as telephone 33, testing system 60, or testing system 50, may occur.

However, in another embodiment, the testing system 50 may be designed to establish the communication session instead of the telephone 22. In such an embodiment, the controller 185 is configured to transmit a call command to session control logic 196. In response, the session control logic 196 is configured to create an off-hook condition on the subscriber loop 31 and then to dial or otherwise transmit the number identifying subscriber loop 44 or 62. Once this occurs, a communication session is established between a communication device, such as telephone 33 or testing system 60, at premises 35 and the testing system 50, or a communication session between multiple ports of the testing system 50 is established, depending on which subscriber loop 44 or 62 is identified by the aforementioned number transmitted by testing system 50.

Furthermore, the session control logic 196 may be configured to create an off-hook condition when the logic 196 detects a ringing signal on subscriber loop 31. Therefore, a communication session between testing systems 50 and 60 or between multiple ports of testing system 50 can be established without the use of telephones 22 and/or 33. In addition, when the communication session should be terminated, the controller 185 may transmit an end session command to session control logic 196. In response, the session control logic 196 may create an on-hook condition or conditions to terminate the communication session. Therefore, if desired, the testing systems 50 and/or 60 may handle all or some of the functionality of establishing and/or terminating a communication session.

By equipping the controller 185 with a DSP, it is possible for the controller 185 to implement the functionality of analyzing the performance data obtained by the DSPs 121, 131, 141, 151, 161, and/or 171. This may be particularly advantageous when there is a large number of DSPs 121, 131, 141, 151, 161, and 171. In this regard, it is possible to form the system 65 on a PCI card and interface the controller 185 to the computer system 75 via a PC bus. Therefore, the configuration of the system 65 can be easily duplicated on multiple PCI cards, which are all interfaced with the computer system 75 to enable the testing system 50 to test a large number of subscriber loops or to test multiple channels of the same or multiple subscriber loops.

However, the computer system 75 could become overburdened with data when a large number of subscriber loops or channels are being tested. By analyzing the data obtained by the DSPs 121, 131, 141, 151, 161, and 171 with a DSP of the controller 185 and providing the results of this analysis to the computer system 75, the work load of the computer system 75 can be significantly reduced, thereby enabling the computer system 75 to manage a large number of interface systems 65.

Operation

The preferred use and operation of the testing system 50 and associated methodology are described hereafter.

Assume that a user would like to test the performance of telephony communication system 15. To achieve this, the user may enter a command via input device 93 (FIG. 5) of computer system 75. Preferably, the command indicates the type of signaling (e.g., FXO, E&M, or both) that is to be used during the test and the type of test that is to be performed (e.g., a test of the quality of the echo signal, a test of the delay of digital network 17, etc.). In response, the system manager 82 of computer system 75 transmits initialization information and the speech data 99 to controller 185. The initialization information is indicative of the type of test that is to be performed. Based on the initialization information, the controller 185 transmits control signals to DSPs 121, 131, 141, 151, 161, and 171 to place each of the DSPs 121, 131, 141, 151, 161, and 171 in the appropriate mode.

For example, assume that a test of the echo signal and of the delay of digital network 17 is to be performed with FXO signaling. Assume further that the configuration of FIG. 3 is utilized to perform the test. In this situation, the controller 185 transmits control signals to DSPs 121, 131, 141, 151, 161, and 171 that place DSP 121 in a transmit mode and a receive mode, that place DSP 131 in a receive mode, and that place DSPs 141, 151, 161, and 171 in a non-active mode. Then, the controller 185 transmits the speech data 99 to DSP 121.

The controller 185, in embodiments where the testing system 50 establishes a communication session, transmits a call command to session control logic 196. In response to the call command, the session control logic 196 creates an off-hook condition at port 111 and dials or otherwise transmits a number identifying subscriber loop 62. In response, the central office 27 transmits a ringing signal across subscriber loop 62. In response to the ringing signal, the session control logic 196 creates an off-hook condition at port 113, and a communication session between ports 111 and 113 of testing system 50 is thereby established.

Once the communication session is established, the DSP 121 then causes the speech data 99 to be transmitted over subscriber loop 31. In particular, the DSP 21 transmits the speech data 99 to D/A converter 123. This transmission may be serial or via the use of data words. The D/A converter 123 converts the digital speech data 99 into analog signals and transmits these analog signals to port 111. The port 111 then interfaces the analog signals with subscriber loop 31.

While the port 111 is interfacing the analog signals from D/A converter 123 with the subscriber loop 31, the port 111 is receiving analog signals from subscriber loop 31. The port 111 transmits these analog signals to A/D converter 125, which converts these analog signals into digital data and transmits the digital data to DSP 121. This transmission may be serial or via the use of data words. At some point, the DSP 121 transmits the digital data received from A/D converter 125 to controller 185, which interfaces this data with computer system 75. The computer system 75 then analyzes this data to determine various performance characteristics associated with the telephony system 15, such as, but not limited to, the signal strength and delay of an echo signal. Data indicative of these performance characteristics may be displayed via display 95 (FIG. 5) or printer 96, for example.

Note that the signals transmitted from port 111 to subscriber loop 31 pass through central office 27, digital network 17, and subscriber loop 62 and are received by the port 113 of testing system 50. The port 113 transmits these analog signals to A/D converter 135, which converts these analog signals into digital data and transmits the digital data to DSP 131. This transmission may be serial or via the use of data words. At some point, the DSP 131 transmits the digital data received from A/D converter 135 to controller 185, which interfaces this data with computer system 75. The computer system 75 then analyzes this data to determine various characteristics of the system 15, such as the delay introduced by digital network 17. The testing system 50 may then display data indicative of these characteristics through conventional techniques.

Once the desired testing has been performed, the controller 185 preferably transmits an end session command to session control logic 196. In response, the session control logic 196 creates an on-hook condition at ports 111 and 113, and the communication session is, therefore, terminated.

Note that in other examples, the performance of the telephony system 15 can be tested via E&M signaling. In these examples, the DSPs 121 and 131, based on control signals from controller 185, are placed into a non-active state, while some or all of the DSPS 141, 151, 161, and 171 are placed in either the transmit or receive state. For example, when the subscriber loop 31 includes only one pair of wires, DSP 141 can be placed in the transmit state and receive state, DSP 151 can be placed in the receive state, and DSPs 161 and 171 can be placed in the non-active state, assuming both DSPs 141 and 151 are coupled to the pair of wires. When the subscriber loop 31 includes two pair of wires, DSPs 141 and 161 can be placed in the transmit state and receive state, and DSPs 151 and 171 can be placed in the receive state, assuming DSPs 141 and 151 are coupled to one pair of wires in the subscriber loop 31 and DSPs 161 and 171 are coupled to the other pair of wires in the subscriber loop 31. Note that in performing other types of tasks, any one of the DSPs 121, 131, 141, 151, 161, and 171 may be placed in the non-active state, the transmit state, the receive state, or the transmit and receive state.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. An apparatus for interfacing with analog subscriber loops of a telephony communication system and for obtaining, from at least one of said analog subscriber loops, digital test data that may be used to test said telephony communication system, comprising:

a digital-to-analog (D/A) converter configured to receive digital data and to convert said digital data into a first analog signal;

a first port of the apparatus configured to interface with a first analog subscriber loop, said first port configured to transmit said first analog signal across said first analog subscriber loop;

a second port of the apparatus configured to interface with a second analog subscriber loop which is a different analog subscriber loop than the first analog subscriber loop, said second port configured to receive a second analog signal from said second analog subscriber loop; and an analog-to-digital (A/D) converter configured to receive said second analog signal and to convert said second analog signal into said digital test data, wherein said first analog signal is transmitted across said first analog subscriber loop to a telephony communication network that translates said first analog signal into said second analog signal and that transmits said second analog signal to said second port via said second analog subscriber loop, thereby establishing a communication session between the first port and the second port of the apparatus for testing a communication path from the first port to the second port.

2. The apparatus of claim 1, further comprising:

a first digital signal processor coupled to said D/A converter, said first digital signal processor configured to transmit said digital data received by said D/A converter; and a second digital signal processor coupled to said A/D converter, said second digital signal processor configured to receive said digital test data.

3. The apparatus of claim 1, wherein said first and second ports are configured for FXO signaling.

4. The apparatus of claim 1, wherein said first and second ports are configured for E&M signaling.

5. The apparatus of claim 1, further comprising session control logic configured to control a hook status of said apparatus and to establish a communication session via said first and second analog subscriber loops.

6. The apparatus of claim 1, further comprising a controller configured to control operation of said apparatus, said controller configured to receive said digital test data, to analyze said digital test data, and to transmit information based on said digital test data to a testing system, said testing system configured to render data indicative of performance of said telephony communication system based on said information.

7. The apparatus of claim 6, wherein said testing system is implemented via a personal computer interfaced with said apparatus and wherein said apparatus is implemented on a PCI card.

8. The apparatus of claim 1, further comprising a controller configured to control operation of said apparatus, said controller configured to receive said digital test data and to transmit said digital test data to a testing system, said testing system configured to render data indicative of performance of said telephony communication system based on said digital test data.

9. The apparatus of claim 8, wherein said testing system is implemented via a personal computer interfaced with said apparatus and wherein said apparatus is implemented on a PCI card.

10. The apparatus of claim 1, further comprising:
a third port configured to interface with said first analog subscriber loop and to transmit analog signals across said first analog subscriber loop via a first type of signaling; and
a fourth port configured to interface with said second analog subscriber loop and to receive analog signals from said second analog subscriber loop via said first type of signaling,
wherein said first and second ports are configured to communicate via a second type of signaling.

11. The apparatus of claim 10, wherein said first type of signaling is E&M signaling and said second type of signaling is FXO signaling.

12. The apparatus of claim 10, wherein said first type of signaling is FXO signaling and said second type of signaling is E&M signaling.

13. The apparatus of claim 1, wherein said first port is further configured to receive an echo signal corresponding with said first analog signal, and wherein said apparatus further comprises a second A/D converter configured to receive said echo signal and to convert said echo signal into digital data.

14. The apparatus of claim 13, wherein said apparatus is interfaced with a testing system, said testing system configured to produce data indicative of performance of said telephony communication system based on said signals received by said first and second ports, said testing system further configured to render said data indicative of said performance of said telephony communication system.

15. A method for obtaining digital test data and for testing a telephony communication system based on said digital test data, comprising the steps of:
transmitting a first analog signal from a subscriber loop interface to a telephony communication network via a first analog subscriber loop coupled to said subscriber loop interface;
receiving a second analog signal at said subscriber loop interface, said second analog signal translated from said first analog signal by said telephony communication network and transmitted to said subscriber loop interface via a second analog subscriber loop which is a different analog subscriber loop than the first analog subscriber loop and is coupled to said subscriber loop interface;
analyzing information defined by said second analog signal; and
determining, based on said analyzing step, a parameter indicative of performance of said telephony communication system according to a communication session carried out across the first analog subscriber loop and the second analog subscriber loop to thereby test a communication path across the first and second analog subscriber loops.

16. The method of claim 15, further comprising the steps of:
receiving digital data from a testing system;
converting said digital data received from said testing system into said first analog signal;
converting said second analog signal into said digital test data; and
performing said analyzing step based on said digital test data.

17. The method of claim 15, further comprising the steps of:
receiving an echo signal from said first analog subscriber loop, said echo signal corresponding with said first analog signal; and
determining, based on said echo signal, a parameter indicative of performance of said telephony communication system.

18. The method of claim 15, further comprising the steps of:
utilizing a first digital signal processor to perform said transmitting step; and
utilizing a second digital signal processor to perform said receiving step.

19. The method of claim 18, wherein said subscriber loop interface includes said first and second digital signal processors, and wherein said method further comprises the steps of:
providing a PCI card, said PCI card including said subscriber loop interface;
interfacing said PCI card with a personal computer;
converting said second analog signal into said digital test data;
transmitting said digital test data from said subscriber loop interface to said personal computer;
performing said analyzing step at said personal computer based on said digital test data; and
rendering said parameter at said personal computer.

20. The method of claim 18, wherein said subscriber loop interface includes said first and second digital signal processors, and wherein said method further comprises the steps of:
providing a PCI card, said PCI card including said subscriber loop interface;
interfacing said PCI card with a personal computer;
transmitting said parameter from said subscriber loop interface to said personal computer; and
rendering said parameter at said personal computer.

21. A system for testing telephony networks, comprising:
a subscriber loop interface comprising a plurality of ports configured to interface with a corresponding plurality of subscriber loops which are different subscriber loops from each other, each port configured to transmit signals to and receive signals from a corresponding subscriber loop;
a controller communicatively coupled with each of the plurality of subscriber ports and configured to control the subscriber loop interface; and
a system manager communicatively coupled with the controller, the system manager configured to transmit test data to the controller, the controller further configured to transmit the test data to the subscriber loop interface,
wherein the subscriber loop interface transmits a first analog signal indicative of the test data via a first selected one of the plurality of ports to the corresponding subscriber loop of the first selected port, and wherein the subscriber loop interface receives, via a second selected one of the plurality of ports, a second analog signal from the corresponding subscriber loop of the second selected port, the second analog signal derived from the first analog signal after the first analog signal has been processed by the telephony network, to thereby test a communication path from said first selected one of the plurality of ports to said second selected one of the plurality of ports.

22. The system of claim 21, further comprising a plurality of digital signal processors, each processor communicatively coupled to the controller, the controller further configured to transmit to each digital signal processor a set of data indicative of speech, each digital signal processor configured to process the data.

23. The system of claim 22, further comprising a plurality of converter pairs, each pair comprising an analog-to-digital converter and a digital-to-analog converter, each converter pair communicatively coupled to a respective one of the ports.

24. The system of claim 23, wherein each converter pair is communicatively coupled to a respective one of the plurality of digital signal processors, each digital-to-analog converter configured to receive the data indicative of the speech from a respective one of the digital signal processors and convert the data indicative of the speech to the first analog signal.

25. The system of claim 24, wherein each analog-to-digital converter is configured, to receive the second analog signal from a respective one of the ports, the analog-to-digital converter configured to convert the second analog signal into digital data and transmit the digital data to the controller via a respective one of the digital signal processors.

26. The system of claim 25, wherein the controller is further configured to transmit the digital data indicative of the received second analog signal to the system manager, the system manager further configured to analyze the digital data to determine the quality of the analog signal transmitted and received from the subscriber loops via the subscriber loop interface.

27. A method comprising:
transmitting a first analog signal through a first analog subscriber loop of a telephony system;
converting the first analog signal, after being transmitted through the first analog subscriber loop, to a digital signal;
transmitting the digital signal through a digital network;
converting the digital signal, after being transmitted through the digital network, into a second analog signal;
receiving the second analog signal from a second analog subscriber loop of the telephony system, the second analog subscriber loop being a different subscriber loop than the first analog subscriber loop; and
analyzing the first analog signal before being transmitted with respect to the second analog signal after being received to determine a parameter indicative of performance of the telephony system.

28. An apparatus comprising:
a first port connected to a first analog subscriber loop of a telephony system, the apparatus providing a first analog signal to the first analog subscriber loop through the first port, wherein the provided first analog signal is transmitted through the first analog subscriber loop and then converted to a digital signal, the digital signal is transmitted through a digital network and then converted into a second analog signal;
a second port connected to a second analog subscriber loop of the telephony system, wherein the second port receives the second analog signal from the second analog subscriber loop through the second port, the second analog subscriber loop being a different subscriber loop than the first analog subscriber loop; and
a computer analyzing the first analog signal before being transmitted with respect to the second analog signal after being received to determine a parameter indicative of performance of the telephony system.

29. An apparatus comprising:
means for providing a first analog signal to a first analog subscriber loop of a telephony system, wherein the provided first analog signal is transmitted through the first analog subscriber loop and then converted to a digital signal, the digital signal is transmitted through a digital network and then converted into a second analog signal;
means for receiving the second analog signal from a second analog subscriber loop of the telephony system, the second analog subscriber loop being a different subscriber loop than the first analog subscriber loop; and
means for analyzing the first analog signal before being transmitted with respect to the second analog signal after being received to determine a parameter indicative of performance of the telephony system.

* * * * *